United States Patent
Brixner et al.

(10) Patent No.: US 8,395,780 B2
(45) Date of Patent: Mar. 12, 2013

(54) OPTICAL ASSEMBLY, APPARATUS AND METHOD FOR COHERENT TWO-OR-MORE-DIMENSIONAL OPTICAL SPECTROSCOPY

(75) Inventors: Tobias Brixner, Gerbrunn (DE); Ulrike Selig, Gerbrunn (DE); Florian Langhojer, Frankfurt/Main (DE); Carl-Friedrich Schleußner, Berlin (DE)

(73) Assignee: Julius-Maximilians-Universitat Wurzburg, Wurzburg (DE)

( * ) Notice: Subject to any disclaimer, the term of this patent is extended or adjusted under 35 U.S.C. 154(b) by 101 days.

(21) Appl. No.: 12/963,182

(22) Filed: Dec. 8, 2010

(65) Prior Publication Data

US 2011/0157594 A1 Jun. 30, 2011

(30) Foreign Application Priority Data

Dec. 9, 2009 (EP) .................................... 09178542

(51) Int. Cl.
*G01B 9/02* (2006.01)
*G01J 3/45* (2006.01)
(52) U.S. Cl. ........................................ 356/452; 356/451
(58) Field of Classification Search .................. 356/450, 356/451, 452; 250/339.07
See application file for complete search history.

(56) References Cited

U.S. PATENT DOCUMENTS

| | | | | |
|---|---|---|---|---|
| 5,479,256 A * | 12/1995 | Tamai et al. | ................... | 356/451 |
| 7,433,043 B2 * | 10/2008 | Birge et al. | ................... | 356/450 |
| 7,771,938 B2 * | 8/2010 | Zanni et al. | ................... | 435/6.18 |
| 7,812,311 B2 * | 10/2010 | DeCamp et al. | ......... | 250/339.07 |
| 2006/0063188 A1 | 3/2006 | Zanni et al. | | |
| 2010/0171952 A1 * | 7/2010 | DeFlores et al. | .............. | 356/327 |
| 2011/0141467 A1 * | 6/2011 | Brixner et al. | ................ | 356/323 |

FOREIGN PATENT DOCUMENTS

| | | |
|---|---|---|
| DE | 10 2008 025 170 | 11/2009 |
| WO | WO 2007/064830 | 6/2007 |
| WO | WO 2009/143957 | 12/2009 |

OTHER PUBLICATIONS

Cowan et al., "Two-Dimensional Spectroscopy Using Diffractive Optics Based Phased-Locked Photon Echoes", Chemical Physics Letters, vol. 386, Jan. 1, 2004, pp. 184-189.
Brixner et al., "Phase-Stabilized Two-Dimensional Electronic Spectroscopy", Journal of Chemical Physics, American Institute of Physics, vol. 121, Jan. 1, 2004, pp. 4221-4236.

(Continued)

*Primary Examiner* — Michael A Lyons
(74) *Attorney, Agent, or Firm* — RatnerPrestia (57) ABSTRACT

An optical assembly for use in coherent two- or more-dimensional optical spectroscopy includes a beam splitter that splits a base light pulse into first, second, third and fourth light pulse and a delay element that varies the arrival times of the first to fourth light pulses at a sample location with respect to each other. The beam splitter includes a cross-grating a first reflector arranged to receive the first to fourth light pulses emerging from the cross-grating and to reflect the same in parallel to each other, a second reflector arranged to receive the first to fourth light pulses from the delay element and to focus the same at the sample location, wherein the delay element is arranged between first and second reflectors. Also shown is an apparatus including such optical assembly and a method for carrying out two- or more-dimensional optical spectroscopy using the assembly.

14 Claims, 5 Drawing Sheets

OTHER PUBLICATIONS

Nemeth et al., "Compact Phase-Stable Design for Single—and Double-Quantum Two-Dimensional Electronic Spectroscopy", Optics Letters Optical Society of America, vol. 34, No. 21, Nov. 1, 2009, pp. 3301-3303.

Selig et al., "Inherently Phase-Stable Coherent Two-Dimensional Spectroscopy Using Only Conventional Optics", Optics Letters Optical Society of America, vol. 33, No. 23, Dec. 1, 2008, pp. 2851-2853.

Gundogdu et al., "Multidimensional Coherent Spectroscopy Made Easy", Chemical Physics, vol. 341, No. 1-3, Nov. 6, 2007, pp. 89-94.

Brixner et al., "Two-Dimensional Spectroscopy of Electronic Couplings in Photosynthesis", Nature 434, 625 (2005).

Jonas et al., "Two-Dimensional Femtosecond Spectroscopy", Annual Ref. Phys. Chem 2003, vol. 54, pp. 425-463.

Minhaeng Cho, "Coherent Two-Dimensional Optical Spectroscopy", Chem Rev. 2008, 108 pp. 1331-1418.

Woutersen et al., Structure Determination of Trialanine in Water Using Polarization Sensitive Two-Dimensional Vibrational Spectroscopy, Journal of Physical Chemistry B 104, 11316 (2000).

Hochstrasser et al., "Structure of the Amide I Band of Peptides Measured by Femtosecond Nonlinear-Infrared Spectroscopy", Journal of Physical Chemistry B 102 6123 (1998).

Tokmakoff et al., " Coherent 2D IR Spectroscopy: Molecular Structure and Dynamics in Solution", Journal of Physical Chemistry A 107, 5258 (2003).

Hybl et al., "Two-Dimensional Fourier Transform Electronic Spectroscopy", Journal of Chemical Physics, vol. 115, No. 14, Oct. 8, 2001, pp. 6606-6622.

Brixner et al., "Tunable Two-Dimensional Femtosecond Spectroscopy", Optics Letters 29, 884 (2004).

Zhang et al., "Optical Two-Dimensional Fourier Transform Spectroscopy With Active Interferometric Stabilization", Optics Express, vol. 13, No. 19, Sep. 19, 2005, pp. 7432-7441.

Prokhorenko et al., "Coherently-Controlled Two-Dimensional Photon Echo Electronic Spectroscopy", Optics Express 17, 9764 (2009).

Hornung et al., "Degenerate Four-Wave Mixing Spectroscopy Based on Two-Dimensional Femtosecond Pulse Shaping", Optics Letters 29, 2052 (2004).

Demrauer et al, "Facile Collection of Two-Dimensional Electronic Spectra Using Femtosecond Pulse-Shaping Technology", Optics Express 15, 16681 (2007).

Tseng et al., "Measurement of Complex $X^{(3)}$ Using Degenerate Four-Wave Mixing With an Imaged 2-D Phase Grating", Opt. Express 14, 8737 (2006).

Tauber et al., "Flowing Liquid Sample Jet for Resonance Raman and Ultrafast Optical Spectroscopy", Rev. of Scient. Instr. 74, 11 (2003).

Laimgruber et al., "A Femtosecond Stimulated Raman Spectrograph for the Near Ultraviolet", Appl. Phys. B 85, 557 (2006).

European Search Report dated May 18, 2010.

International Search Report dated Jul. 31, 2009.

* cited by examiner

Fig. 1

PRIOR ART

Fig. 2

PRIOR ART

OPTICAL ASSEMBLY, APPARATUS AND METHOD FOR COHERENT TWO-OR-MORE-DIMENSIONAL OPTICAL SPECTROSCOPY

FIELD OF THE INVENTION

The present invention relates to an optical assembly for use in coherent two- or more-dimensional optical spectroscopy, an apparatus employing such optical assembly and a related method of coherent two- or more-dimensional optical spectroscopy.

Herein, the term "optical spectroscopy" may refer to spectroscopy in the infrared (IR), visible and ultraviolet (UV) spectral range.

BACKGROUND

Generally, optical spectroscopy allows to investigate the structure of matter on an atomic level. While linear spectroscopy mainly allows to investigate stationary states, non-linear, time-resolved methods allow to investigate dynamical behaviour as well. However, the well established time-resolved techniques such as transient absorption spectroscopy and transient diffraction spectroscopy are still limited to the measurement of quantum mechanical populations, while the underlying reason for any dynamical behaviour of a quantum mechanical system, namely the couplings between quantum mechanical states are not accessible by these spectroscopic methods.

In order to investigate the couplings between quantum mechanical states, the so-called coherent two-dimensional (2D) spectroscopy may be employed, to which the present invention relates. By systematically varying time delays between three exciting laser pulses and carrying out a complete measurement of the non-linear optical response one may directly obtain information about the couplings between quantum states, which then allows to study energy transfer processes in complex systems at a spatial resolution on a nanometer scale and with a time resolution on the order of femtoseconds.

The results of such measurements are usually presented in intuitively understandable 2D-spectra, in which the emission frequency of the system is plotted versus the excitation frequency. Intensities of this 2D-spectrum lying off the diagonal axis, i.e. intensities for which the excitation and emission frequency are different from each other are indicative of couplings and thus transfer between individual energy levels. These intensities are also termed "cross peaks" for obvious reasons. Using 2D-spectroscopy one obtains the complete spectroscopic information up to third order, as all conventional spectroscopic techniques such as transient absorption etc. are implicitly included.

While 2D-spectroscopy is by far the most common type of multi-dimensional spectroscopy, it is nevertheless possible to use a larger number of excitation pulses and to consequently generate higher dimensional spectra. For example, five excitation pulses have been used in order to generate a fifth order optical signal. In the following description, for simplicity, reference is made to 2D-spectroscopy only. However, it is to be understood that the principles introduced herein may also be employed for higher dimensional spectroscopy.

Figure 1:
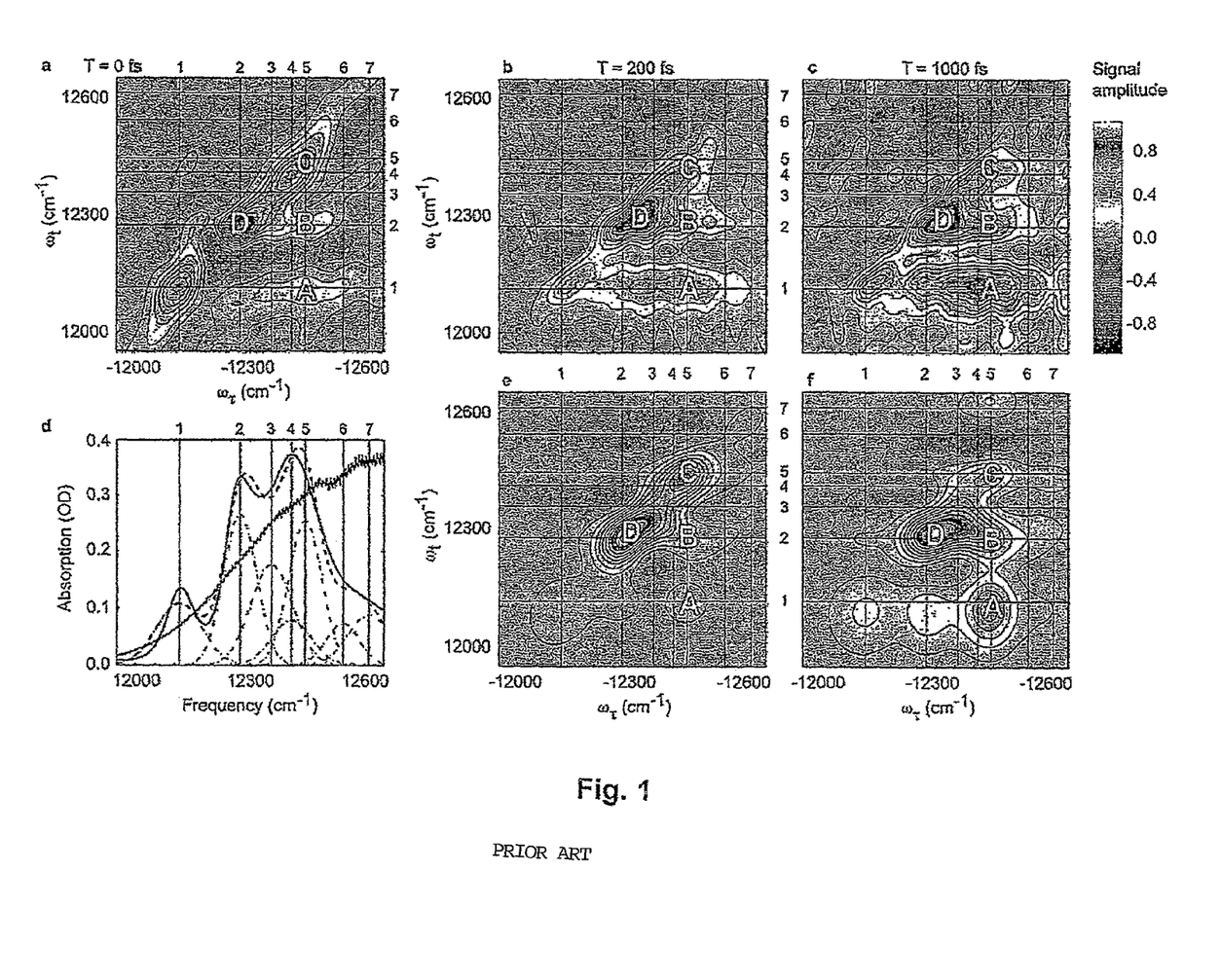
FIG. 1 shows a plurality of 2D-spectra for illustrative purposes.

An illustrative example for 2D-spectra is shown in FIG. 1, which has been taken from T Brixner, J. Stenger, H M Vaswani, M Cho, R. E. Blankenship, and G. R. Fleming, "Two-dimensional spectroscopy of electronic couplings in photosynthesis", Nature 434, 625 (2005). Diagrams a, b and c of FIG. 1 show the 2D-spectra of the Fenna-Mathews-Olson (FMO) bacterium chlorophyll a (BChl) protein of green suphur bacteria, which serves both as an antenna for collecting light energy and as a mediator for directing light excitations from the chlorosome atenna to the reaction center. In diagrams a to c of FIG. 1 the horizontal axis corresponds to the absorption frequency $\omega_\tau$ and the vertical axis corresponds to the emission frequency $\omega_t$. The 2D-spectra of diagrams a to c correspond to population times T of 0 fs, 200 fs and 1,000 fs, respectively, where the "population time" refers to the time between the second and third excitation light pulses.

Diagram d shows the experimental linear absorption spectrum (solid black) and its theoretically modelled counter part (dashed line), where individual excitation contributions are also shown (dashed-dotted line). In diagrams e and f, simulations of 2D-spectra are shown for T32 200 fs (diagram e) and T=1,000 fs (diagram f). Off-diagonal features such as those labelled A and B are indicators of electronic coupling and energy transport.

The reason for the occurrence of the non-diagonal intensity peaks A and B ("cross peaks") in the spectra is that the structure of components of the macro molecules to which peaks A and B correspond are "aware" of each other. More precisely, this means that the structure components are so close to each other that a mutual quantum mechanical coupling exists, and the pulse sequence measures transitions between the states. The intensity in the 2D-spectrum represents the probability that a photon having the frequency $\omega_\tau$ is absorbed and is emitted after a population time T at a frequency $\omega_t$. Note that such information cannot be discerned from one-dimensional spectra, and the example may illustrate the usefulness of and unique information contained in 2D-spectra.

Optical 2D-spectroscopy is in a sense analogous to 2D-NMR, which is nowadays a standard method for structure analysis of molecules and which is used in practically any chemical laboratory using commercially available apparatuses. 2D-NMR is based on the coupling between nuclear spins of individual atoms and therefore reflects the molecular structure. As is understood from the above description of FIG. 1, however, optical 2D-spectroscopy is sensitive to couplings between full chromophores, i.e. couplings between large molecular units or functional groups. As such, 2D-spectroscopy may reflect supramolecular structures which are of paramount interest and importance for many technical and scientific applications, for example in the field of organic photovoltaics, natural and artificial photosynthesis complexes, quantum dot systems etc. In addition, using 2D-spectroscopy dynamical processes on an ultrafast time scale in the femtosecond regime are accessible, while NMR-spectroscopy is limited to a time resolution on the order of milliseconds.

For a more complete description of the principles of coherent 2D optical spectroscopy, reference is made to the review article "Two-dimensional femtosecond spectroscopy" of *David M. Jonas, Annual Ref. Phys. Chem.* 2003, Vol. 54, 425-463, and to the review article "Coherent two-dimensional optical spectroscopy" of *Minhaeng Cho, Chem. Rev.* 2008, 108: 1331-1418 and the references cited therein.

Ever since the primary works by Hamm et al. (S. Woutersen and P. Hamm. "Structure determination of trialanine in water using polarization sensitive two-dimensional vibrational spectroscopy", *Journal of Physical Chemistry B* 104, 11316 (2000)), Hochstrasser et al. (P. Hamm, M H Lim, and R. M Hochstrasser, "Structure of the amide i band of peptides measured by femtosecond nonlinear-infrared spectroscopy", *Journal of Physical Chemistry B* 102, 6123 (1998)), and Tokmakoff et al. (M. Khalil, N. Demirdoven, and A. Tokmakoff, "Coherent 2D IR spectroscopy: molecular structure and dynamics in solution", *Journal of Physical Chemistry A* 107, 5258 (2003)), coherent optical 2D-spectroscopy in the IR regime can be regarded as a well established method. 2D-spectroscopy for electronic transitions in the near infrared at 800 nm has been developed by Jonas et al. (J. D. Hybl, A. W. Albrecht, S. M. G. Faeder, and D. M. Jonas, "Two-dimensional electronic spectroscopy", *Chemical Physics Letter*).

In the implementation of the two-dimensional spectroscopy, generally a non-collinear so-called "box"-geometry is chosen. Herein, the non-linear third order signal, i.e. the non-linear signal generated in response to an interaction of the sample with three ultrashort laser pulses is completely characterized by interference with a fourth and known laser pulse, which is referred to as the local oscillator, LO. A prerequisite for this so-called heterodyne detection, however, is that the optical phases of the individual pulses are constant with respect to each other. In other words, the setup must ensure that no unintentional variations in the arrival times of the pulses at the sample location may occur.

Clearly, phase stability is the more difficult to achieve, the shorter the wavelength of the light signal is. For example, since the typical IR wavelength is about a factor of 10 longer than a wavelength in the visible spectrum, this means that in the IR regime, for the same phase stability 10 times larger variations in the optical paths can be tolerated, which for example could be introduced by vibrations of mirrors or other optical components. This is why in IR 2D-spectroscopy, generally no special means for phase stabilization are necessary.

In 2004, the 2D-spectroscopy method has been applied for shorter wavelengths in the visible spectral region by Brixner et al. (T. Brixner, I. V. Stiopkin, and G. R. Fleming, "Tunable two-dimensional femtosecond spectroscopy", *Optics Letters* 29, 884 (2004); T. Brixner, T Mančal, I. V. Stiopkin, and G. R. Fleming, "Phase-stabilized two-dimensional electronic spectroscopy", *Journal of Chemical Physics* 121, 4221 (2004)), and by Miller et al. (M. L. Cowan, J. P. Ogilvie, and R. J. D. Miller, "Two-dimensional spectroscopy using diffractive optics based phased-locked photon echoes", *Chemical Physics Letters* 386, 184 (2004); V. I. Prokhorenko, A. Halpin, R. J. D. Miller, "Coherently-controlled two-dimensional photon echo electronic spectroscopy", *Optics Express* 17, 9764 (2009)). The method of Miller et al. uses a diffractive optical element at which two beams are split into a total of four beams, where two of the beams are each stable in phase with respect to each other. The two initial beams are, however, generated in a conventional manner using transmissive beam splitters. Herein, time delays between the pulses are introduced using conventional delay lines and retroflectors or rotatible glass plates. The setup of Brixner et al. also uses a diffractive optical element, however, instead of conventional delay lines, pairs of slideable or movable glass wedges are used to precisely introduce the delays.

A further method for obtaining phase stability and for introducing precise delays have been suggested by Nelson et al. (T. Hornung, J. C. Vaughan, T. Feurer, and K. A. Nelson, "Degenerate four-wave mixing spectroscopy based on two-dimensional femtosecond pulse shaping", *Optics Letters* 29, 2052 (2004)), and by Damrauer and Zanni (E. M Grumstrup, S.-H. Shim, M. A. Montgomery, N. H. Damrauer, and M. T. Zanni, "Facile collection of two-dimensional electronic spectra using femtosecond pulse-shaping technology", *Optics Express* 15, 16681 (2007)). Herein, an active phase modulator is employed in a pulse shaping device.

Figure 2:
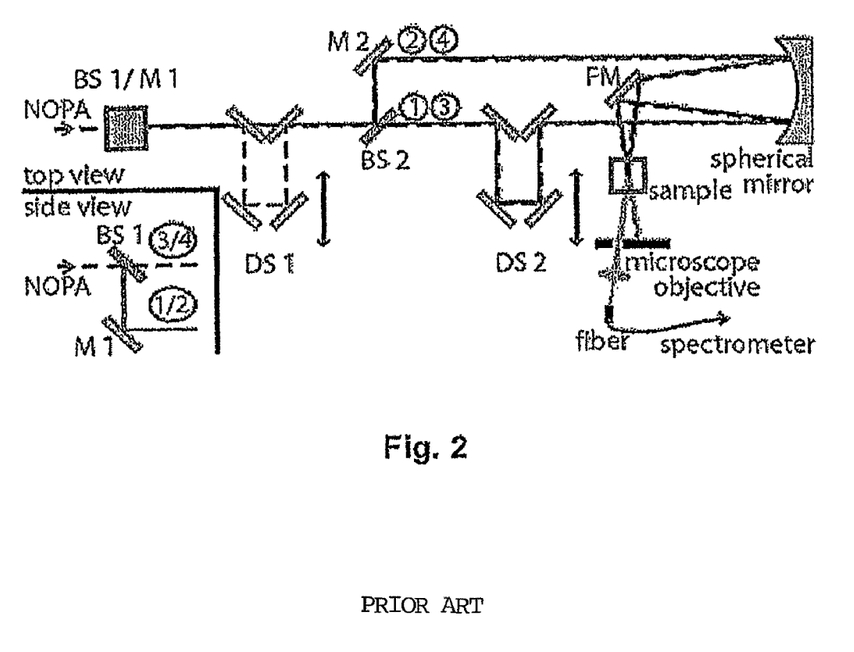
FIG. 2 schematically shows an apparatus for coherent two-dimensional optical spectroscopy according to prior art, FIG. 3 schematically shows an apparatus for coherent two-dimensional optical spectroscopy according to an embodiment of the present invention.

FIG. 2 schematically shows a further prior art experimental setup proposed by the present inventors, where the figure has been cited from U Selig, F. Langhojer, F. Dimler, T. Löhrig, C. Schwarz, B. Giesking, T. Brixner, "Inherently phase-stable coherent two-dimensional spectroscopy using only conventional optics" *Optics Letter* 33, 2851 (2008). The same setup is also described in detail in German patent DE 10 2008 025 170. As can be seen in FIG. 2, the incoming beam is split by a first beam splitter (BS1) having a conventional metallic coating. The transmitted beam (dashed line) propagates in the drawing plane, and the reflected beam (dotted line) is redirected by mirror M1 into a parallel and vertically displaced plane. Both beams hit a second conventional metallic beam splitter BS2, now creating four beams, of which three are used as excitation pulses (pulses ①, ② and ③) and one is used as a local oscillator signal ④ in a standard non-collinear box geometry after focussing with the spherical mirror via a folding mirror FM into the sample.

Time delays between the pulses are provided by two piezo stages, namely a stage DS1 for delaying pulse pair ③/④ versus pulse pair ①/② and a stage DS2 for delaying pulse pair ①/③ versus pulse pair ②/④. The heterodyne signal which corresponds to the interference signal of the third order optical signal due to interaction of pulses ①, ② and ③ with a sample on the one hand and the fourth light pulse ④ (i.e. the local oscillator) on the other hand passes through an aperture. It is collected with a microscope objective and then passed through a single-mode fibre to a CCD array spectrometer. Since only pulse pairs are delayed and no individual beam hits any individual mirror or beam splitter, an inherent phase stabilization is achieved.

The phase stabilization can be understood considering that the signal phase $\phi_s$ depends on the arrival times $t_i$ of the three excitation pulses as $\exp(i\phi_S) \sim \exp(i\omega_0(-t_1+t_2+t_3))$, and the phase of the oscillating part of the spectral interference fringe pattern is $\phi_{SI} = \phi_{LO} - \phi_S$, where $\phi_{LO}$ is the phase of the fourth light pulse, i.e. the local oscillator signal. Any path length changes due to mirror vibrations etc. will result in variations $\Delta t_i$ of the arrival times. In the setup of FIG. 2, the corresponding phase fluctuations $\omega_0 \Delta t_i$ are correlated in the sense that between beam splitters BS1 and BS2, one obviously has $\Delta t_1 = \Delta t_2$ and $\Delta t_3 = \Delta t_4$, because beams ① and ② as well as ③ and ④ have not been separated yet. The subsequent handling of beam pairs ①/③ and ②/④ leads to $\Delta t_1 - \Delta t_3$ and $\Delta t_2 = \Delta t_4$. Accordingly, the following equation holds:

$$\omega_0(-\Delta t_1 + \Delta t_2 + \Delta t_3 - \Delta t_4) = 0,$$

which means that the detected spectral interference fringes are stable. For a more detailed explanation and derivation of this phase stabilization, reference is made to section II of DE 10 2008 025 170, in particular to equations (1) through (8) and the corresponding explanation, which shall not be repeated here but is incorporated herein by reference.

In U. Selig, F. Langhojer, F. Dimler, T. Löhrig, C. Schwarz, B. Gieseking, T. Brixner, "Inherently phase-stable coherent two-dimensional spectroscopy using only conventional optics" *Optics Letters* 33, 2851 (2008), from which FIG. 2 is taken, it has been demonstrated that the setup provides indeed a remarkable phase stability and reproducibility. Remarkably, the inherent phase stability of the setup allows to completely dispense with diffractive optical elements, as the separation of the light beams is achieved solely by ordinary beam splitters BS1 and BS2. An advantage of avoiding a diffractive optical element is that a spatial chirp associated with the diffractive optical element, which becomes noticeable for larger band widths, can be avoided, as is explained in detail in DE 10 2008 025 170.

An article by Nemeth et. al. (Compact phase-stable design for single- and double-quantum two-dimensional electronic spectroscopy, Alexandra Nemeth, Jaroslaw Sperling, Jürgen Hauer, Harald F. Kauffmann and Franz Milota, to be published in Optics Letters) has been posted under http://www.opticsinfobase.org on Oct. 2, 2009. In this article, an optical assembly for 2D-spectroscopy is shown, in which a base light pulse is simultaneously split into four light pulses using a transmissive optical grating. The four light beams are parallelised using a combination of a flat mirror and a spherical mirror and are focused using a similar combination of a spherical mirror and a flat mirror. Three out of the four light pulses are individually delayed using pairs of transmissive glass wedges that are movable with respect to each other.

In spite of the enormous advantages of 2D-spectroscopy, from an experimental point of view, the technique is still rather difficult to implement. Until today no 2D-spectroscopy apparatuses are commercially available, instead, 2D-spectroscopy is still only practised by experts in the field of ultrafast spectroscopy. There is thus a need for an experimental setup that would be simple and stable enough to be used by a broader range of scientists with no particular expertise in ultrafast optics.

While with the different advances in the field summarized above the transition from IR to visible optical spectra could be achieved, until now it has not been possible to carry out 2D-spectroscopy in the UV range, because the phase stability criterion becomes even more difficult to meet, as the wavelengths are again a factor of 2 or 2.5 smaller than in the visible range.

However, it would be most desirable to make 2D-spectroscopy also available in the UV regime, since this would allow to study quantum mechanical couplings in completely new classes of samples which in this regard have hardly been understood so far, such as proteins. Currently, electronical processes in proteins are usually investigated using fluorescence techniques and transient absorption. However, it has so far not been possible to investigate couplings in a time-resolved manner, while exactly this would be extremely interesting for many proteins. For example, ultrafast charge transfer processes in proteins are barely understood up to now, and neither are the ultrafast changes in the spatial conformation of highly delocalized excimeres in proteins. 2D-spectroscopy at wavelengths as low as 250 nm could be the key for understanding ultrafast protein dynamics of different types, such as charge transfer in cryptochromes, initial stimulation of bacteriorhodopsin and understanding the mechanisms responsible for the photo stability of DNA. Also, UV 2D-spectroscopy could allow to study aromatic amino acids, which are generally believed to be the key for understanding the photo chemistry of proteins. While in current 2D-spectroscopy in the visible range one is still dependent on the spectral position of suitable chromophores, 2D-spectroscopy in the ultraviolet regime would allow to study mostly any type of organic substances, their supra molecular configuration and their ultrafast dynamics.

A problem underlying the invention is to provide an optical assembly for 2D-sepctroscopy that is simple in construction and stable in operation. A further problem underlying the invention is to provide an optical assembly for a 2D-spectroscopy apparatus which is especially suitable for carrying out 2D-spectroscopy at wavelengths in the UV regime.

SUMMARY

According to the invention, an optical assembly for use in coherent 2- or more-dimensional optical spectroscopy is provided. The optical assembly employs a combination of the following three special technical features:

(i) A cross-grating, and in particular a reflective cross-grating is employed to simultaneously split a base pulse into a first, a second, a third and a fourth light pulses, (ii) a first off-axis parabolic mirror or reflective microscope objective is arranged to receive the first to fourth light pulses emerging from the cross-grating and to reflect the same in parallel to each other and/or a second off-axis parabolic mirror or reflective microscope objective is arranged to receive the first of fourth light pulses after having passed the delay means and focus the same at a sample location, and (iii) the delay means comprise stationary and movable reflectors arranged such as to reflect the first to fourth light pulses pairwisely, wherein the pairs of pulses are chosen such that the effects a common delay of the pulses of a pair has on the phase of an interference signal between a third order signal generated by interaction of three of the light pulses with a sample and a remaining light pulse at least partially compensate each other.

According to feature (i), the four light pulses are generated simultaneously at a single location using either a transmissive or a reflective cross-grating. Accordingly, the four light pulses have an inherent phase stability. This is different from ordinary prior art, in which usually at least one ordinary beam splitter is used. This is also very different from the inventor's former setup shown in FIG. 2, where the four light beams had been generated using two ordinary beam splitters, which proved to be very functional in the visible regime.

In fact it would appear that when using a cross-grating for splitting the beams, there is a problem of angle dispersion at the grating due to the different frequencies contained in short pulses, which leads to a spatial chirp of the light pulses propagating through the optical assembly. However, using the off-axis parabolic mirrors or microscope objectives according to feature (ii), it is possible to map the point of origin of the four light pulses at the grating onto the point at the sample site, and due to this optical imaging, a spatial chirp that may occur between the off-axis parabolic mirrors will vanish at the sample site due to the imaging. Accordingly, with this type of imaging, it turns out that the spatial chirp, that was deliberately avoided in the former setup of FIG. 2 by using ordinary beam splitters, can actually be tolerated.

Indeed, it turns out that especially at short wavelengths, a further error plays an important role, which is associated with the so-called pulse front tilt. The "pulse front" is defined as the surface in which the intensity maximum of the beam diameter lies at any given instant in time. Unlike the phase front, the pulse front need not necessarily be perpendicular to the propagation direction, but can be tilted with regard to the phase front by a small angle. The problem with a pulse front tilt is that it impairs the time resolution of the pulses at the sample.

A pulse front tilt occurs if the spatially chirped pulses passes through a dispersive medium. Unfortunately, the dispersion becomes more pronounced for shorter wavelengths, and particularly pronounced in the UV regime. However, the optical assembly allows to entirely dispense with transmissive optical components, at least for the first to third pulses for which the timing is the most critical. Namely, according to special technical feature (iii) above, the delay means comprise stationary and movable reflectors instead of transmissive delay means as are for example employed in the above referenced paper of Nemeth et. al. While introducing delays by glass wedges allows for a higher precision and reproducibility, the varying glass thickness will lead to a delay-dependent phase of the three excitation pulses. This problem is overcome by the use of delay lines based on reflectors. Furthermore, reflective delay lines avoid the problem of introducing pulse front tilts. Also, since the pulses are delayed in mutually phase stabilizing pairs, a sufficient phase stabilization of the interference signal can be achieved even when movable mirrors are used for introducing delays, and even for short wavelengths in the visible or even UV regime.

With respect to feature (ii) above, it is further noted that employing an off-axis parabolic mirror in combination with the cross-grating allows for an extremely compact setup, which is not only advantageous for practical purposes, but also adds to the phase stability. In particular, the effect of airflows on the individual light paths can be reduced to a minimum, which significantly adds to the phase stability. While using one of the first and second reflectors to be an off-axis parabolic mirror already adds to the compactness, preferably both reflectors are off-axis parabolic mirrors. As will be shown with reference to an embodiment below, using a combination of a cross-grating and two off-axis parabolic mirrors, the light paths of the pulses could be reduced from 105 cm of the setup of FIG. 2, which already had been believed to be very short, to only 65 cm.

A similar compactness can also be achieved if one or both of the first and second reflector means is a reflective microscope objective. A preferred reflective microscope objective may comprise a convex spherical mirror and a concave spherical mirror opposing each other. Such type of preferable reflective microscope objective is also known under the name of "Schwarzschild objective", an example of which is shown below.

Also, a combination of an off-axis parabolic mirror and a microscope objective may be used. In an especially advantageous embodiment, the first reflector means is an off-axis parabolic mirror and the second reflector means is a microscope objective.

The first and second reflector means may have an identical focal length, thus allowing for a true one-to-one optical imaging. However, in a preferred embodiment, the second reflector means has a focal length smaller than that of the first reflector means. In that case, the diameter of the first to fourth light beams overlapping at the sample site will be smaller than the beam diameter of the base pulse impinging on the cross-grating. A somewhat larger beam diameter at the cross-grating has at least two important advantages. First of all, a larger beam diameter at the cross-grating will allow to cover more of the grating lines, which allows for a more precise split of the beams. Second, a larger beam diameter at the cross-grating allows for a smaller intensity at the cross-grating for a given beam power. The inventors have noticed that when using a one-to-one imaging, it was difficult to find a compromise between a sufficiently high intensity at the sample site to obtain a pronounced signal and a sufficiently low intensity at the cross-grating so as to not damage the same. Using a smaller focal length at the second reflector means, or, in other words, a de-magnified imaging, allows to increase the intensity at the sample site without increasing the intensity a the cross-grating.

In particular, if the second reflector means is a microscope objective having an optical axis parallel to the propagation direction of the first to fourth light pulses impinging thereon, imaging errors can be avoided even if there is a de-magnifying imaging instead of a one-to-one imaging.

Also, using only two optical elements for splitting the base pulse and generating the four parallel beams in a box geometry and using only a single reflector for focussing the pulses, the number of optical components employed is smaller than in any prior art setup, which adds to simplicity and robustness of the optical assembly.

It is worth mentioning that a transmissive cross-grating has already been used in a four-wave-mixing-experiment in the IR regime (S.-Y. Tseng, W. Cao, Y.-H. Peng, J. M. Hales, S.-H. Chi, J. W. Perry, S. R. Marder, C. H. Lee, W. N. Herman, and J. Goldhar, "Measurement of complex $X^{(3)}$ using degenerate four-wave mixing with an imaged 2-D phase grating," *Opt. Express* 14, 8737 (2006)), although not in an assembly suitable for 2D-spectroscopy.

Preferably, the delay means comprise stationary and moveable reflectors arranged such as to reflect the first to fourth light pulses pairwisely, wherein the pairs of pulses are chosen such that the effects a common delay of the pulses of a pair has on the phase of the aforementioned interference signal between a third order signal generated by interaction of three of the light pulses with a sample and the remaining light pulse at least partially compensate each other. In other words, preferably the inherent phase stabilization described in DE 10 2008 025 170 is also employed in the framework of the invention.

Preferably, the delay means comprise a first delay unit for introducing a delay between a pulse pair comprised of the first and second light pulses and a pulse pair comprised of the third and fourth light pulses, wherein the first delay unit comprises a first and a second reflector assembly which are moveable with respect to each other, wherein the first reflector assembly is arranged in a first plane, in which the first and second light pulses propagate and the second reflector assembly is arranged in a second plane in which the third and fourth light pulses propagate.

By arranging the first and second delay unit in the respective planes, it is easily possible to introduce a delay between the two pulse pairs with only little constructional effort. It is emphasized that the terms "first", "second", "third" and "fourth pulse" used to define the structure of the optical assembly do not necessarily refer to an order in which the pulses arrive at the sample location, but are only referred to distinguish the individual pulses when explaining the geometry of the optical assembly.

Preferably, the first and second reflector assemblies each comprise a first and a second reflecting surface which are arranged at an angle. Also, the optical assembly preferably comprises a third reflector assembly, preferably a prism, having first and second reflecting surfaces, wherein said first surface is parallel to the first surfaces of the first and second reflector assemblies and the second surface is parallel to the second surfaces of the first and second reflector assemblies. Preferably, the angle between the first and second surfaces of the third reflector assembly is a right angle. Accordingly, the third reflector assembly may be a single element, in particular a single prism which allows to reflect all four light pulses twice and thus helps to decrease the number of optical components, adds to the assembly's robustness and facilitates its adjustment.

Preferably, the optical assembly comprises a second delay unit for introducing a delay between a pulse pair comprised of the first and third light pulses and a pulse pair comprised of the second and fourth light pulses. Herein, the second delay unit comprises a fourth reflector assembly, a fifth reflector assembly and a sixth reflector assembly, wherein the fourth reflector assembly comprises first and second reflecting surfaces arranged at an angle with respect to each other are arranged to:

reflect the first and third light pulses towards the fifth reflector assembly and reflect the second and fourth light pulses towards the sixth reflector assembly, wherein at least one of the fifth and sixth reflector assemblies is moveable relative to the fourth reflector assembly. Again, this allows to selectively delay pulse pairs with respect to each other using only reflective elements.

Preferably, the fourth reflector assembly comprises a third and a fourth reflecting surface, and the fifth and the sixth reflector assembly each comprise a first and a second reflecting surface arranged at an angle, wherein the first surface of the fourth reflector assembly is parallel to the first surface of the fifth reflector assembly, the second surface of the fourth reflector assembly is parallel to the first surface of the sixth reflector assembly, the third surface of the fourth reflector assembly is parallel to the second surface of the fifth reflector assembly, and the fourth surface of the fourth reflector assembly is parallel to the second surface of the sixth reflector assembly.

Herein, the fourth reflector assembly is preferably a cuboid prism having four mirror faces. The fourth reflector assembly is thus a single optical component which allows to separate two pairs of light pulses in different directions by first and second reflecting surfaces and to receive the two pulse pairs from the fifth and sixth reflector assemblies on its third and fourth surfaces. Again, this allows to keep the total number of optical components small and to facilitate adjusting and tuning of the optical assembly, as all four surfaces of the fourth reflector assembly are intrinsically aligned with respect to each other.

Preferably, the optical assembly comprises receiving means for receiving and exchanging the cross-grating. This allows to easily exchange cross-gratings for use for different wavelengths, without having to change the remainder of the optical assembly.

The optical assembly further preferably comprises shutter means for selectively blocking one or more of the first to fourth light pulses. This allows to measure scattering terms which can later be used to correct the experimentally detected interference signal.

As mentioned above, the optical assembly is preferably completely free of transmissive elements, which allows to keep the pulse front tilt to a minimum and makes the assembly especially suitable for operation in the UV range. However, it is to be understood that the optical assembly, the apparatus and the method of the invention are by no means limited to applications in the UV range, but are also advantageous when used in the IR and visible ranges.

Preferably, the optical assembly comprises moving means for moving the first and second reflector assemblies with respect to each other and/or moving means for moving at least one of the fifth and sixth reflector assemblies relative to the fourth reflector assembly, wherein the moving means comprise a motor driven or manually moved mount allowing larger movements and at least one piezo actuator allowing smaller movements of the respective reflector assembly.

The invention also relates to an apparatus for use in coherent two- or more-dimensional optical spectroscopy, comprising an optical assembly as defined in one of the above mentioned embodiments and a detector assembly for detecting an interference signal between a third order signal generated by interaction of three of the light pulses with the sample and the remaining light pulse.

Preferably, the apparatus further comprises a UV light source for generating the base pulse, wherein the base pulse has a wavelength of 400 nm or shorter. Also, the apparatus preferably comprises a spectrometer suitable for detecting an interference signal in frequency space.

Preferably, the detector assembly comprises a first optical fiber having a first end for receiving the interference signal between a third order signal and the local oscillator, a second optical fiber having a first end for receiving the light signal of a pump-probe signal and/or a third optical fiber having a first end for receiving a portion of the base light pulse, wherein the first optical fiber and one or both of the second and third optical fibers are coupled into the same spectrometer.

Herein, the spectrometer preferably has an entrance slit for light signals, and the second ends of the first and one or both of the second ends of the second and third fibers are spaced in longitudinal direction of said slit. This allows to measure, in addition to the interference signal, a pump-probe signal and/or a portion of the base light pulse with the same spectrometer, using separate ranges of the CCD chip thereof. Note that the pump-probe signal can be used for determining the absolute phase of the 2D spectrum. In particular, the pump-probe signal may be measured for each population time. A projection of the 2D spectrum on the axis of the frequency $\omega_r$ should correspond with the pump-probe spectrum if the correct absolute phase is chosen. By using the first and the second fibers, the 2D measurement and pump-probe measurement for calibration purposes can be carried out alternately without having to change any optical components. This also allows the calibration data to be measured immediately after each 2D spectrum, which adds to the precision of the measurement, since any error due to a spectral drift in the excitation spectrum or drifts in the times of arrival can be kept to a minimum.

Using the third fiber, the reference spectrum of the base light pulse can be measured in order to correct for any variations in the laser generating the base pulse. Also, with this reference spectrum it is no longer necessary to measure the spectrum of the local oscillator for each measurement point. Instead, the ratio of the local oscillator spectrum and the reference spectrum need only be determined once at the beginning of the measurement, and the local oscillator signal can then be reconstructed from the reference spectrum. This dramatically reduces the overall measuring time by 25 to 50%, depending on the number of scattering terms that are recorded. Also, this way the precision of the measurement is further enhanced, since the reference spectrum is measured simultaneously with the interference signal.

In a preferred embodiment, the apparatus further comprises a wire-guided gravity driven jet apparatus for providing a liquid sample jet at the sample location. The jet apparatus comprises two substantially vertical wire portions arranged next to each other such that a liquid sample film may be formed therebetween, and supplying means for supplying a liquid sample to the region between the wire portions. A gravity driven jet apparatus per se is for example known from M. Tauber, R. Mathies, X. Chen, and S. Bradforth, "Flowing liquid sample jet for resonance Raman and ultrafast optical spectroscopy," Rev. of Scient. Instr., 74, 11 (2003); and S. Laimgruber, H. Schachenmayr, B. Schmidt, W. Zinth, and P. Gilch, "A femtosecond stimulated raman spectrograph for the near ultraviolet," Appl. Phys. B 85, 557 (2006).

DETAILED DESCRIPTION

For the purposes of promoting an understanding of the principles of the invention, reference will now be made to the preferred embodiment illustrated in the drawings, and specific language will be used to describe the same. It will nevertheless be understood that no limitation of the scope of the invention is thereby intended, such alterations and further modifications in the illustrated apparatus and method and such further applications of the principles of the invention as illustrated therein being contemplated as would normally occur now or in the future to one skilled in the art to which the invention relates.

Figure 3:
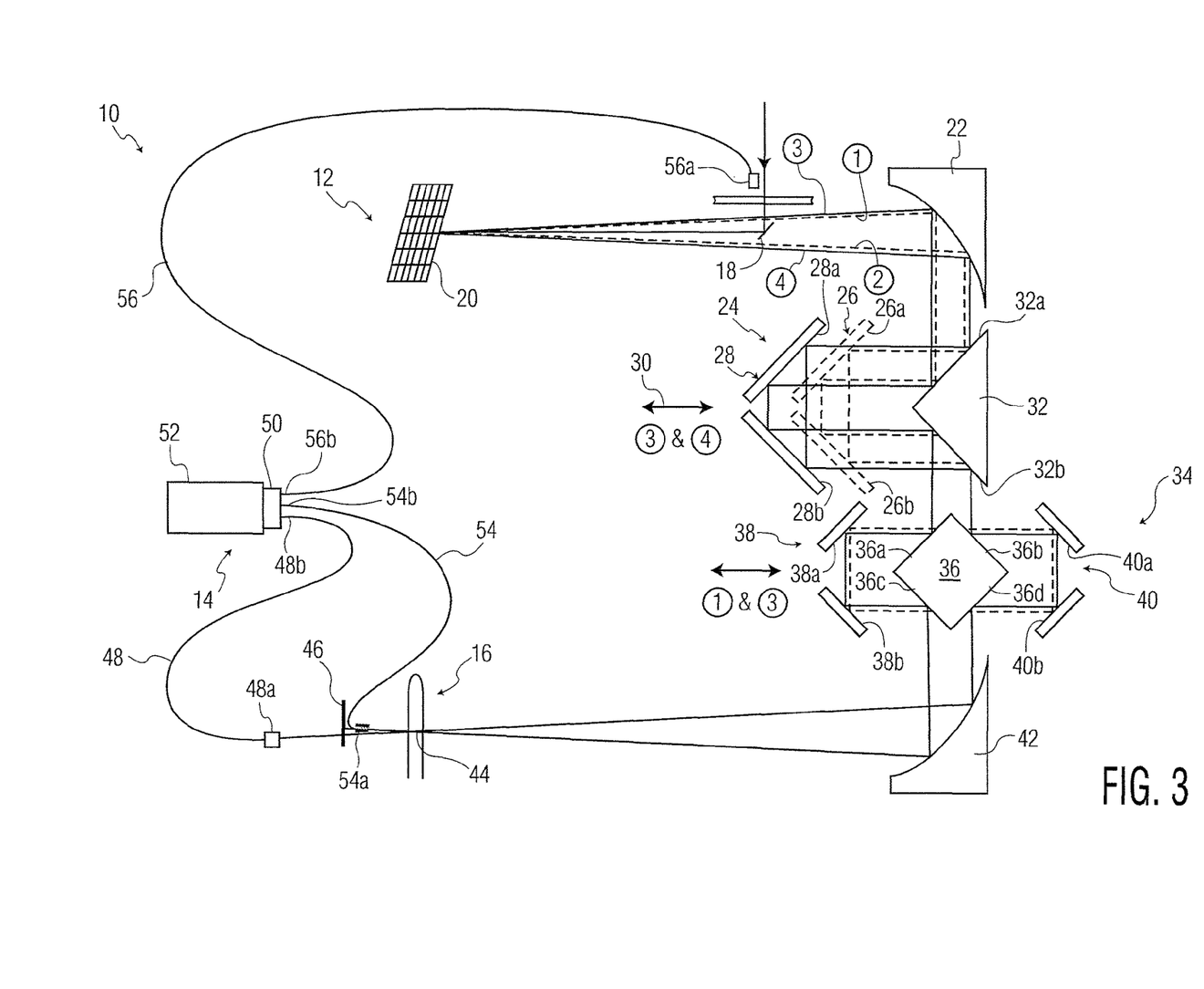

In FIG. 3, a schematic view of an apparatus 10 for use in coherent two- or more-dimensional optical spectroscopy according to a preferred embodiment of the invention is shown. The main constituents of the apparatus 10 shown in FIG. 3 are an optical assembly 12, a detector assembly 14, a jet apparatus 16 for generating a liquid sample jet and a light source, which is not shown in FIG. 3. In the preferred embodiment, a wide band light source may be used having a frequency doubled non-collinear amplifier, which is for example commercially available under the name "TOPAS-white". The light source used in the preferred embodiment has a wavelength tuneable between 250 and 375 nm, i.e. in the UV spectrum. While the apparatus of the invention is particularly useful for coherent 2D-spectroscopy in the UV regime, it is nevertheless emphasized that the apparatus and method is also advantageous for use in the visible or even IR regime.

A base light pulse generated by the light source, also termed "base pulse" herein, is reflected by a folding mirror 18 onto a reflective optical cross-grating 20. Instead of a reflective cross-grating 20, alternatively, a transmissive cross-grating could also be used. The base pulse is focussed onto the cross-grating 20 in order to provide sufficient intensity for the four pulses to generate a detectable third order signal after interaction with the sample.

The reflective cross-grating 20 is optimized for a maximum reflection in the first diffraction orders. Accordingly, four pulses or beams are generated according to the first horizontal and vertical orders of the cross-grating 20, a first beam ①, a second beam ②, a third beam ③ and a fourth beam ④. Note that as far as the description of the geometry of the optical assembly 12 is concerned, the terms "light pulse" and "light beam" are used interchangeably herein, wherein a "beam" defines the direction of propagation of the corresponding "light pulse".

A first off-axis parabolic mirror 22 is arranged to receive the first to fourth light beams ① to ④. The off-axis parabolic mirror is an optical element configured to reflect an incoming spherical wave as a plane wave and vice versa. The site at which the base pulse impinges onto the cross-grating coincides with the focal point of the first off-axis parabolic mirror 22. Accordingly, the first to fourth light beams ① to ④ received from the cross-grating 20 are reflected as four parallel beams by the off-axis parabolic mirror 22 in the so-called "box-geometry", i.e. the light pulses ① to ④ propagate along the edges of an imaginary cuboid.

The first and second light beams ①, ② are arranged in a first plane, which in the embodiment shown is a lower horizontal plane, i.e. a plane below the paper plane of FIG. 3. This is indicated in FIG. 3 in that the light beams ① and ② as well as optical components exclusively arranged in the first or lower plane are shown in broken lines. The third and fourth light beams ③, ④ propagate in a second or upper horizontal plane which corresponds to the paper plane in FIG. 3.

After reflection of the first off-axis parabolic mirror 22, the four light beams ① to ④ enter a first delay unit 24 for introducing a delay between the pulse pair comprised of the first and second light pulses ①, ② and a pulse pair comprised of the third and fourth light pulses ③, ④. The first delay unit 24 comprises a first reflector assembly 26 which is arranged in the first or lower plane only, and a second reflector assembly 28 which is arranged in the second or upper plane only. The first reflector assembly 26 comprises first and second reflecting surfaces 26a, 26b, respectively, which are arranged at an angle of 90°. Likewise, the second reflector assembly 28 comprises two perpendicular reflective surfaces 28a, 28b. The first and second reflector assemblies 26, 28 are moveable with respect to each other to thereby introduce a delay between the pulse pairs ①/② and ③/④. In the embodiment shown in FIG. 3, the second reflector assembly 28 is mounted on a motor driven stage (not shown) which allows to move the second reflector assembly 28 as indicated by arrow 30. In addition to the motor driven stage, the second reflector assembly 28 can be further shifted very precisely by use of piezo actuators (not shown).

The first delay means 24 further comprises a third reflector assembly 32, which in the embodiment shown is a triangular prism having first and second reflecting surfaces 32a, 32b. The first and second reflecting surfaces 32a, 32b extend through both, the first and the second planes, such that all four pulses ① to ④ can be reflected at each surface 32a, 32b. The first and second surfaces 32a, 32b of the third reflector assembly 32 are parallel to the first surfaces 26a, 28a and the second surfaces 26b, 28b of the first and second reflector assemblies 26, 28, respectively.

Downstream of the first delay unit 24, a second delay unit 34 is disposed. The second delay unit 34 comprises a fourth reflector assembly 36 which in the present embodiment is formed by a mirrored cuboid having first through fourth reflecting surfaces 36a to 36d. The edge between the first and second reflecting surfaces 36a, 36b of the cuboid 36 extends in a vertical direction, i.e. perpendicular to the first and second planes. Thus, while the first delay unit 24 is devised to distinguish pulses according to their vertical position, the fourth reflector assembly 36 is suitable to separate pulse pairs according to their horizontal position. In particular, the cuboid 36 reflects the first and third pulses ①, ③ to the left in FIG. 3 towards a fifth reflector assembly 38 and the second and fourth light pulses ②, ④ to the right in FIG. 3 towards a sixth reflector assembly 40. The fifth and sixth reflector assemblies 38, 40 are similar to the first and second reflector assemblies, except that they extend through both horizontal planes. Further, the fifth reflector assembly 38 is moveable with respect to the fourth and sixth reflector assemblies 36, 40 such as to introduce a delay between the pulse pairs ①/② and ③/④. The pulse pairs ①/② and ③/④ are reflected from the second reflecting surfaces 38b, 40b of the fifth and sixth reflector assemblies 38, 40, respectively to be received by the third and fourth reflecting surfaces 36c, 36d of the cuboid 36 (i.e. fourth reflector assembly 36) and are further reflected onto a second off-axis parabolic mirror 42.

Since the first through fourth light beams are nearly perfectly parallel when impinging on the second off-axis parabolic mirror 42, they will be precisely focussed on and overlapped at a sample location 44 which coincides with the focal point of the second off-axis parabolic mirror 42. In the embodiment shown, the first and second off-axis parabolic mirrors 22, 42 are of identical shape. Conversely, there is a true one-to-one optical imaging between the point of origin of the light beams ①  to ④ at the cross-grating 20 and their overlap at sample location 44. However, in a preferred alternative embodiment, the focal length of the second parabolic mirror may be smaller than that of the first, thus leading to a de-magnifying imaging, by which the intensity at the sample site can be increased for a given intensity at the cross-grating 20, which in turn is limited by the tolerance of the cross-grating with respect to light intensity.

Figure 5:
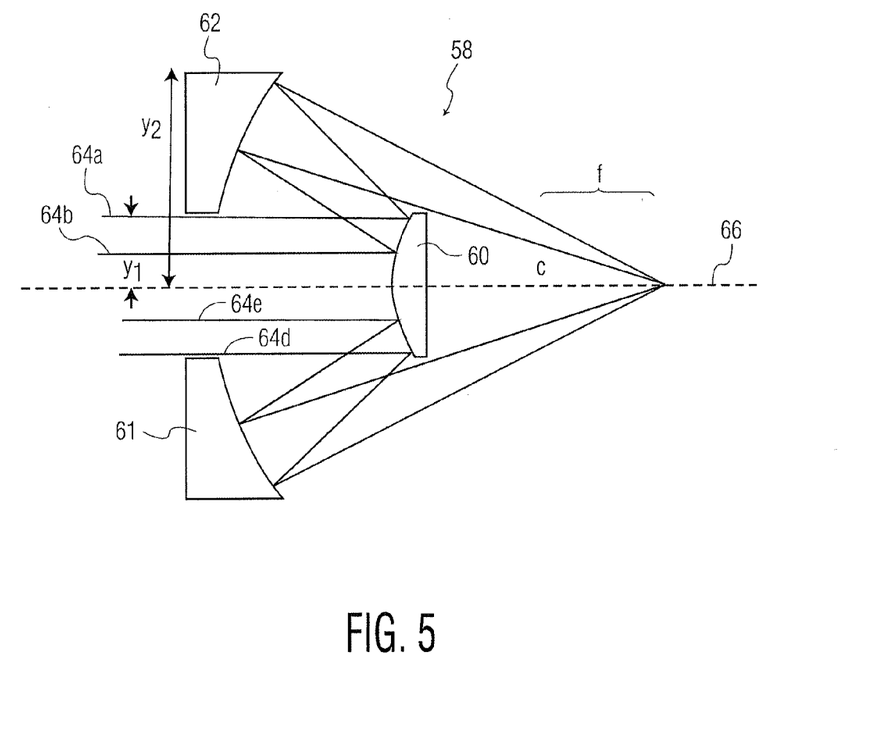
FIG. 5 shows a schematic optical diagram of a microscope objective.

Instead of the second parabolic mirror 42, a reflective microscope objective may also be used. An optical diagram of an exemplary reflective microscope objective 58 is shown in FIG. 5. The reflective microscope objective comprises a smaller convex mirror 60 and a larger concave mirror 62 having a central aperture through which in FIG. 5 four parallel sample beams 64a to 64d are entering. The optical axis of the reflective microscope objective 58 is shown as dashed line 66. In the embodiment shown, the microscope objective is a so-called Schwarzschild objective, in which the two spherical mirrors 60 and 62 are concentric to each other with regard to a common centre c. In the example shown, the radii of the convex and concave mirrors 60, 62 are $(\sqrt{5}-1)f$ and $(\sqrt{5}+1)f$, respectively, where f is the focal length of the reflective microscope objective 58. Note that the schematic diagram of FIG. 5 is not drawn to scale in this regard.

The radii $y_1$, $y_2$ of the convex and concave lenses 60, 62, respectively, obey the following relation: $y_2 = (\sqrt{5+2}) \cdot y_1$. With these dimensions, third-order spherical aberration, coma and astigmatism can be eliminated. Again, the focal length f of the microscope objective 58 when used instead of the second off-axis parabolic mirror 42 of FIG. 3 could be smaller than the focal length of the first off-axis parabolic mirror 22 in order to establish a de-magnifying imaging.

Moreover, a microscope objective could also be used instead of the first off-axis parabolic mirror in order to collimate the first to fourth light pulses ① to ④ generated at the cross-grating 20. In this case, the focal point of the microscope objective would be located at the point where the base pulse impinges on the cross-grating 20, and the focal length of the reflective microscope objective would be matched with the angle of diffraction such that the first to fourth light pulses ① to ④ would avoid the back side of the convex mirror 60.

Referring again to FIG. 3, the jet apparatus 16 mentioned above is located at the sample location 44. While the jet apparatus 16 is not shown in detail in FIG. 3, it comprises two vertical wires 16a, 16b (see FIG. 4) spaced about 3 mm from each other. A liquid sample film is formed therebetween, and the sample film runs down between the two vertical wires 16a, 16b due to gravitational force.

Figure 4:
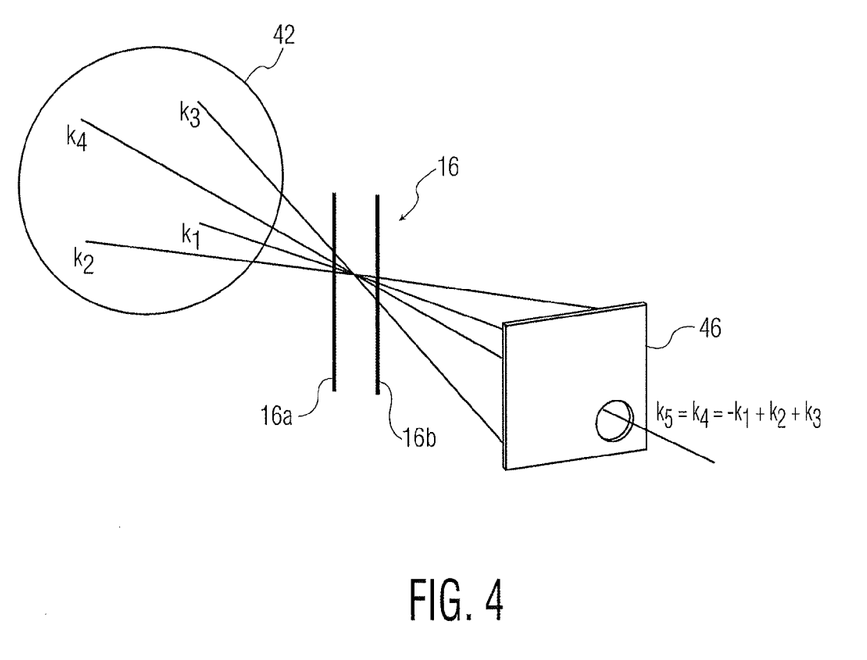
FIG. 4 shows a perspective view of a second off-axis parabolic mirror, a jet apparatus, an aperture and light beams ① to ④ as used in the apparatus of FIG. 3.

The jet apparatus 16 further comprises supplying means (not shown) to continuously supply liquid sample to the region between the vertical wires, thus generating an "endless" liquid sample film having a constant thickness of 100 μm. The advantage of using such a liquid sample film instead of an ordinary glass cell or cuvette is that this allows to dispense with any glass provided in the light path. As has been explained above, dispensing completely with transmissive optical components helps to avoid pulse front tilting, which becomes more and more pronounced for short wavelengths due to increased dispersion and is thus especially important, when the apparatus is operated in the UV regime. Note that a liquid sample jet apparatus per se has been suggested in M. Tauber, R. Mathies, X. Chen, and S. Bradforth, "Flowing liquid sample jet for resonance Raman and ultrafast optical spectroscopy," *Rev. of Scient. Instr.* 74, 11 (2003); and S. Laimgruber, H. Schachenmayr, B. Schmidt, W. Zinth, and P. Gilch, "A femtosecond stimulated raman spectrograph for the near ultraviolet," *Appl. Phys. B* 85, 557 (2006).

When the first through third light pulses ① to ③ interact with the sample at location 44, a third order light signal is generated. The wave vector of the third order signal $\vec{k}_s$ obeys the following condition $\vec{k}_s = -\vec{k}_1 + \vec{k}_2 + \vec{k}_3$ where $\vec{k}_1$, $\vec{k}_2$ and $\vec{k}_3$ are the wave vectors of the first through third light pulses. The wave vector $\vec{k}_s$ of the third order signal has the same direction as the wave vector $\vec{k}_4$ of the fourth light pulse, which functions as the local oscillator. The third order signal and the fourth light pulse therefore propagate in the same direction and can interfere with each other.

Downstream of the sample location 44, an aperture 46 is provided which only passes the fourth light pulse and the third order signal, but not light pulses ① to ③. This is shown in more detail in FIG. 4, where the second off-axis parabolic mirror 42, the jet apparatus 16 and the aperture 46 are schematically shown in a perspective view.

The interference signal is coupled into a first end 48a of a first single mode wave guide. While the second end 48b is coupled into a three-fiber adaptor 50, which is mounted in front of a spectrometer 52.

A second wave guide 54 has a first end 54a arranged to receive the third light pulse after passing the sample location 44 and a second end 54b also coupled to the three-fiber adaptor 50.

Finally, a third single mode wave guide 56 has a first end 56a arranged to receive a small fraction of the base light pulse reflected from a transparent plate 58, while the second end 56b of the third wave guide 56 is again coupled into the three-fiber-adaptor 50. Note that a dispersion that would be introduced by transparent plate 58 can be pre-compensated by a suitable compression of the base pulse prior to passing the transparent plate 58.

The fiber adaptor 50 is disposed in front of an entrance slit of the spectrometer 52 such that the second ends 48b, 54b and 56b of the first through third fibers 48, 54, and 56, respectively are arranged in longitudinal direction of the slit, and the light signals passed therethrough can be mapped onto the same two-dimensional CCD chip but at different locations, which again are offset in longitudinal direction of the slit. Note that the very narrow ends of the fiber already acts like a slit, so that actually no additional physical slit needs to be provided. Accordingly, the corresponding three spectra can be simultaneously measured without having to change any optical component of the optical assembly 12.

The whole apparatus 10 can be mounted on a 60 cm×60 cm board. However, the footprint of the optical assembly 12 itself is only 30 cm×15 cm and is separated from the rest of the apparatus by dividing walls (not shown). The whole apparatus 10 is contained in a housing, for example a box made from acrylic glass. The optical path between the cross-grating 12 and the sample location 44 is only about 65 cm long. By minimizing the optical path and providing the separation walls (not shown) the influence of temperature variations and air flow can be kept to a minimum. A similar compact assembly can be obtained if one or both of the off-axis parabolic mirrors are replaced by reflective microscope objectives.

While not shown in FIG. 3, shutters are provided to selectively block any one of pulses ① o ④, which allows to determine scattering terms which can then be used to correct the measured interference signal as per se known in the art.

Next, the operation of the apparatus 10 will be described. When the apparatus 10 is used in 2D-spectroscopy, the following steps are carried out:

First, the base pulse is brought to the desired spectral form and is time-compressed. While not shown in FIG. 3, the optical assembly 12 comprises two apertures arranged in a row by which the proper alignment of the base pulse is guaranteed.

Next, the time-zero-point (i.e. the complete temporal overlap of all four pulses) is determined by means of spectral interferometry at sample site 44. For this, the first and second delay units 24, 34 are adjusted such that the best possible overlap for pulses ① and ② and for pulses ② and ③ is achieved. Also, the arrival time of the local oscillator signal ④ is determined by spectral interferometry. Then, the jet apparatus 16 is arranged at the sample site 44.

The time delay $\tau$ between the first and second light pulses ①, ②, the so-called "coherence time", and the time T between the second and third light pulses ②, ③, the so-called "population time" can be independently adjusted by proper control of the first and second delay units 24, 34. At $T=\tau=0$, a third order signal is generated that propagates in the same direction as the fourth light pulse ④ (i.e. the local oscillator). Both of these signals are coupled into the first end 48a of the first optical fiber 48 and into the spectrometer 52.

The contribution of the scattering terms, i.e. contribution to the signal which are only due to one or two of the beams are minimized. Next, the measurement can be performed automatically under the control of a suitable computer program. For each data point, the delay times $\tau$ and T are adjusted by control of the first and second delay units 24, 34, and the spectral interference of the fourth light pulse ④ (i.e. the local oscillator) and the third order signal is recorded by the spectrometer 52.

In addition, optionally the stray terms can be recorded for a numerical correction of the signal. For this purpose, the shutters (not shown) can be selectively opened and closed to obtain the desired combination of light pulses.

Importantly, as explained in the introductory part of the application, the first and second delay units 24, 34 are arranged and devised such that only pulse pairs are delayed with respect to each other, namely pulse pairs ①/② versus ③/④ in the first delay unit 24 and pulse pairs ①/③ versus ②/④ in the second delay unit 34. What is more, in fact all of the optical components of the optical assembly 12 are arranged such that pulses are always reflected pairwisely and the pairs are always chosen such that the effects of the delays common to the pulses of that pair on the phase of the interference signal compensate each other at least partially. Hence, the optical assembly 12 leads to an inherent phase stabilization. Any phase fluctuation that can be introduced either voluntarily by the delay lines or inadvertently due to for example vibrations of optical components will thus be largely compensated by the two pulses forming such pulse pairs.

Further, the four pulses ① to ④ have an inherent phase stability, since they are simultaneously generated by the cross-grating 20. Since the two identical off-axis parabolic mirrors 22 and 42 provide for a true one-to-one imaging between the diffraction site at the cross-grating 20 and the sample site 44, a very precise spatial overlap of the four pulses at the sample site 44 occurs.

It is further emphasized that the optical assembly 12 comprises reflective means only and thus completely dispenses with transmissive elements, such that undesired dispersion effects can be avoided. As explained above, this is especially important in the UV regime, where non-linear dispersion effects are especially pronounced. In particular, this allows to avoid the aforementioned pulse front tilt, such that a maximum time-resolution can be achieved.

It is also worth mentioning that the number of components employed in the optical assembly 12 is extremely small. This is in part achieved by using prisms 32 and 36 having two and four reflecting surfaces, respectively, such that a maximum number of beams is reflected by the same optical components. This again leads to an increased phase stability and also facilitates the adjustment and tuning of the optical assembly 12. In effect this allows that three nearly identical laser pulses interact with the quantum system of the sample.

By using the three-fiber-adaptor 50, three different signals can be simultaneously fed into the same spectrometer 52, namely the interference signal, which is the actual signal of interest, a pump-probe signal which is needed for calibration of measured spectra and the back reflection signal from plate 58, which at every instance provides a reference spectrum by which laser fluctuations can be corrected for in the data analysis.

In fact, by recording the reference spectrum it is no longer necessary to measure the local oscillator spectrum at every measuring point. Instead, the relation between the local oscillator spectrum and the reference spectrum is only determined once at the beginning of the measurement, and the local oscillator spectrum can then be determined from the reference spectrum at every measuring point. This actually leads to a reduction of the measuring time on the order of 25 to 50%. Also, the reconstruction of the signal field from the measurement data is even more precise, since the reference spectrum is actually recorded simultaneously with the interference signal, while according to prior art, these signals would be recorded one after another. Please note that all three different signals can be measured without having to modify the optical assembly 12.

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention.

The invention claimed is:

1. An optical assembly for use in coherent two- or more-dimensional optical spectroscopy, comprising
   a cross-grating configured to simultaneously split a base pulse into at least a first, a second, a third and a fourth light pulse,
   delay means for varying the arrival times of said first through fourth light pulses at a sample location with respect to each other,
   said delay means being adapted to independently adjust a time delay between the first and second light pulses and a time delay between the second and third light pulses,
   wherein said delay means comprise stationary and moveable reflectors arranged such as to reflect said first to fourth light pulses pairwisely,
   wherein said pairs of pulses are chosen such that the effects a common delay of the pulses of a pair has on the phase of an interference signal between
   a third order signal generated by interaction of three of the light pulses with a sample, and
   a remaining light pulse
   at least partially compensate each other,
   a first reflector arranged to receive the first to fourth light pulses emerging from said cross-grating and reflect the same in parallel to each other, and
   a second reflector arranged to receive said first to fourth light pulses after having passed the delay means and focus the same at said sample location,
   wherein at least one of the first and second reflectors is an off-axis parabolic mirror or a reflective microscope objective comprising a convex spherical mirror and a concave spherical mirror opposing each other.

2. The optical assembly of claim 1, wherein said first and second reflectors have equal focal lengths, or wherein the second reflector has a focal length smaller than that of the first reflector.

3. The optical assembly of claim 1, wherein said delay means comprise a first delay unit for introducing a delay between a pulse pair comprised of said first and second light pulses and a pulse pair comprised of said third and fourth light pulses,
said first delay unit comprising a first and a second reflector assembly which are moveable with respect to each other,
wherein in the first reflector assembly Is arranged in a first plane in which said first and second light pulses propagate, and
the second reflector assembly is arranged in a second plane in which said third and fourth light pulses propagate.

4. The optical assembly of claim 3, wherein the first and second reflector assemblies each comprise a first and a second reflecting surface which are arranged at an angle, and
a third reflector assembly having first and second reflecting surfaces,
said first surface being parallel to the first surfaces of said first and second reflector assemblies, and
said second surface being parallel to the second surfaces of said first and second reflector assemblies.

5. The optical assembly of claim 1, wherein said delay means comprises a second delay unit for introducing a delay between a pulse pair comprised of said first and third light pulses and a pulse pair comprised of said second and fourth light pulses,
said second delay unit comprising a fourth reflector assembly, a fifth reflector assembly and a sixth reflector assembly,
wherein the fourth reflector assembly comprises first and second reflecting surfaces arranged at an angle with respect to each other and arranged to
reflect the first and third light pulses towards said fifth reflector assembly and
to reflect said second and fourth light pulses towards said sixth reflector assembly,
wherein at least one of the fifth and sixth reflector assemblies is moveable relative to the fourth reflector assembly.

6. The optical assembly of claim 5, wherein the fourth reflector assembly comprises a third and a fourth reflecting surface, and
the fifth and sixth reflector assemblies each comprise first and second reflecting surfaces arranged at an angle,
wherein the first surface of the fourth reflector assembly is parallel to the first surface of the fifth reflector assembly,
the second surface of the fourth reflector assembly is parallel to the first surface of the sixth reflector assembly,
the third surface of the fourth reflector assembly is parallel to the second surface of the fifth reflector assembly, and
the fourth surface of the fourth reflector assembly is parallel to the second surface of the sixth reflector assembly.

7. The optical assembly of claim 1, wherein the optical paths of the first to third light pulses between the cross-grating and the sample location are free of transmissive optical elements.

8. An apparatus for use in coherent two- or more-dimensional optical spectroscopy, comprising:
an optical assembly as defined in claim 1, and
a detector assembly for detecting an interference signal between a third order signal generated by interaction of three of said light pulses with a sample and the remaining light pulse.

9. The apparatus of claim 8, further comprising a UV-light source for generating said base pulse, said base pulse having a wavelength of 400 nm or shorter.

10. The apparatus of claim 8, wherein the detector assembly comprises a spectrometer suitable for detecting the interference signal in frequency space.

11. The apparatus of claim 10, wherein the detector assembly comprises a first optical fibre having a first end for receiving said interference signal between said third order signal and the remaining light pulse,
at least one of a second optical fibre having a first end for receiving the light signal of a pump-probe signal, or a third optical fibre having a first end for receiving a portion of the base light pulse,
wherein said first optical fibre, the at least one of said second optical fibre or said third optical fibre are coupled into the same spectrometer.

12. The apparatus of claim 11, wherein a second end of the first and one or both of the second ends of the at least one of the second or third fibres are arranged in a row and coupled with the spectrometer.

13. The apparatus of claim 8, further comprising a wire-guided gravity-driven jet apparatus for providing a liquid sample jet at said sample location,
comprising two substantially vertical wire portions arranged next to each other such that a liquid sample film may be formed therebetween, and
supplying means for supplying a liquid sample to the region between said wire portions.

14. A method of coherent two- or more-dimensional optical spectroscopy comprising the following steps:
splitting a base light pulse into at least a first, a second, a third and a fourth light pulse using a cross-grating
delaying the arrival times of said first to fourth light pulses at a sample location with respect to each other pairwisely to thereby independently adjust a time delay between the first and second light pulses and time delay between the second and third light pulses, wherein pairs of pulses are chosen such that the effects a common delay of the pulses of a pair has on the phase of an interference signal between
a third order signal generated by interaction of three of the light pulses with a sample, and
a remaining light pulse
at least partially compensate each other, wherein the first to fourth light pulses emerging from the cross-grating are reflected in parallel to each other by a first reflector and the first to fourth light pulses, after having passed the delay means are focussed on the sample location using a second reflector wherein at least one of the first and second reflectors is
an off-axis parabolic mirror or
a reflective microscope objective comprising a convex spherical mirror and a concave spherical mirror opposing each other.

* * * * *